(12) United States Patent
Wen

(10) Patent No.: US 12,744,688 B2
(45) Date of Patent: Sep. 22, 2026

(54) MEETING CONTROL METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Cun Wen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 211 days.

(21) Appl. No.: 18/637,690

(22) Filed: Apr. 17, 2024

(65) Prior Publication Data

US 2024/0267244 A1 Aug. 8, 2024

Related U.S. Application Data

(63) Continuation of application No. PCT/CN2023/092000, filed on May 4, 2023.

(30) Foreign Application Priority Data

Jun. 28, 2022 (CN) ......................... 202210749780.4
Jun. 30, 2022 (CN) ......................... 202210770957.9

(51) Int. Cl.
*H04N 7/15* (2006.01)
*H04L 12/18* (2006.01)
(Continued)

(52) U.S. Cl.
CPC ...... *H04L 12/1822* (2013.01); *H04L 12/1818* (2013.01); *H04L 65/403* (2013.01);
(Continued)

(58) Field of Classification Search
None
See application file for complete search history.

(56) References Cited

U.S. PATENT DOCUMENTS

2006/0017805 A1* 1/2006 Rodman .................. H04N 7/15 348/E7.083
2010/0188473 A1* 7/2010 King ....................... H04M 3/56 348/E7.083

(Continued)

FOREIGN PATENT DOCUMENTS

CN 108462853 A 8/2018
CN 111818292 A 10/2020
CN 115941876 A 4/2023

OTHER PUBLICATIONS

The World Intellectual Property Organization (WIPO) International Search Report for PCT/CN2023/092000 Aug. 8, 2023 5 Pages (including translation).

(Continued)

*Primary Examiner* — Quoc D Tran
(74) *Attorney, Agent, or Firm* — Anova Law Group, PLLC

(57) ABSTRACT

A meeting control method includes: displaying, in response to a control connection instruction for a target meeting in a meeting display terminal, a control interface corresponding to the target meeting, and displaying an operation control for controlling the target meeting in the control interface; performing, in response to a meeting control instruction triggered based on the operation control, a meeting control operation indicated by the meeting control instruction on the target meeting; and transmitting a meeting control operation result corresponding to the meeting control operation to the meeting display terminal.

19 Claims, 8 Drawing Sheets

(51) Int. Cl.
*H04L 65/403* (2022.01)
*H04N 7/14* (2006.01)

(52) U.S. Cl.
CPC ............... *H04N 7/147* (2013.01); *H04N 7/15* (2013.01); *H04N 7/152* (2013.01)

(56) References Cited

U.S. PATENT DOCUMENTS

| | | | | |
|---|---|---|---|---|
| 2014/0267577 | A1 | 9/2014 | Weber et al. | |
| 2015/0109399 | A1* | 4/2015 | Kuscher .................. | H04N 7/15 348/14.02 |
| 2022/0191259 | A1* | 6/2022 | Leppänen ............. | G06F 3/0484 |
| 2022/0413794 | A1* | 12/2022 | Qiao ..................... | H04L 65/403 |
| 2023/0164201 | A1* | 5/2023 | Kumar Agrawal ...... | H04N 7/15 348/14.03 |

OTHER PUBLICATIONS

"Tencent conference DTMF usage introduction", https://meeting.tencent.com/support-doc-detail/663/index.html 14 Pages (including translation).

"This section describes the DTMF usage of Zoom gateway", "Changing the video layout on a SIP/H.323 device", https://support.zoom.us/hc/en-us/articles/201207626-Changing-the-video-layout-on-a-SIP-H-323-device, 7 pages.

* cited by examiner

MEETING CONTROL METHOD, ELECTRONIC DEVICE, AND STORAGE MEDIUM

CROSS-REFERENCES TO RELATED APPLICATIONS

This application is a continuation application of PCT Patent Application No. PCT/CN2023/092000, filed on May 4, 2023, which claims priority to Chinese Patent Application No. 202210749780.4 filed on Jun. 28, 2022, all of which is incorporated by reference in their entirety.

FIELD OF THE TECHNOLOGY

The present disclosure relates to the field of communication technologies, and in particular, to a meeting control method and apparatus, an electronic device, a computer-readable storage medium, and a computer program product.

BACKGROUND OF THE DISCLOSURE

Typical hardware devices for video meetings usually support the standard H.323/Session Initiation Protocol (SIP). The H.323/Session Initiation Protocol uses a protocol converter to join an online meeting. The protocol converter converts between the standard H.323 or SIP communication protocol and a private protocol for an online meeting, and supports interoperability of signaling and audio and video media formats. However, an earlier released H.323/SIP protocol definition cannot support conversion and transmission of operations related to increasingly complex, flexible meeting control. For example, control operations such as turning on/off a microphone/camera and switching layout cannot be controlled effectively.

To effectively control meeting room devices from existing video meeting manufacturers, most of the devices are implemented through dual tone multi frequency (DTMF) channels, and using a remote control and a customized key combination. This, however, requires a user to spend a great deal of time learning key combinations and is inconvenient to operate, resulting in low efficiency in controlling a meeting.

SUMMARY

One aspect of the present disclosure provides a meeting control method performed by a terminal. The meeting control method includes: displaying, in response to a control connection instruction for a target meeting in a meeting display terminal, a control interface corresponding to the target meeting, and displaying an operation control for controlling the target meeting in the control interface; performing, in response to a meeting control instruction triggered based on the operation control, a meeting control operation indicated by the meeting control instruction on the target meeting; and transmitting a meeting control operation result corresponding to the meeting control operation to the meeting display terminal.

Another aspect of the present disclosure provides an electronic device. The electronic device includes a memory, configured to store executable instructions; and one or more processors, configured to execute the executable instructions stored in the memory to implement: displaying, in response to a control connection instruction for a target meeting in a meeting display terminal, a control interface corresponding to the target meeting, and displaying an operation control for controlling the target meeting in the control interface; performing, in response to a meeting control instruction triggered based on the operation control, a meeting control operation indicated by the meeting control instruction on the target meeting; and transmitting a meeting control operation result corresponding to the meeting control operation to the meeting display terminal.

Another aspect of the present disclosure provides a non-transitory computer-readable storage medium, containing executable instructions stored thereon that, when being executed, cause at least one processor to implement: displaying, in response to a control connection instruction for a target meeting in a meeting display terminal, a control interface corresponding to the target meeting, and displaying an operation control for controlling the target meeting in the control interface; performing, in response to a meeting control instruction triggered based on the operation control, a meeting control operation indicated by the meeting control instruction on the target meeting; and transmitting a meeting control operation result corresponding to the meeting control operation to the meeting display terminal.

DESCRIPTION OF EMBODIMENTS

To make the objectives, technical solutions, and advantages of the present disclosure clearer, the following describes embodiments of the present disclosure in detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following description, the term "some embodiments" describes subsets of all possible embodiments, but it may be understood that "some embodiments" may be the same subset or different subsets of all the possible embodiments, and can be combined with each other without conflict.

In the following description, the term "first/second . . . " involved is only used for distinguishing similar objects and does not represent a specific order of objects. It may be understood that "first/second . . . " may be interchanged with a specific order or priority if permitted, so that embodiments of the present disclosure described here may be implemented in an order other than that illustrated or described here.

Unless otherwise defined, meanings of all technical and scientific terms used in this specification are the same as those usually understood by a person skilled in the art to which the present disclosure belongs. Terms used in the specification are merely intended to describe objectives of the embodiments of the present disclosure, but are not intended to limit the present disclosure.

Before the embodiments of the present disclosure are further described in detail, a description is made on terms in the embodiments of the present disclosure, and the terms in the embodiments of the present disclosure are applicable to the following explanations.

(1) H.323/SIP protocol: It is an international standard protocol for video communication. An H.323 or a SIP protocol is made by the International Telecommunication Union (ITU) or the Internet Engineering Task Force (IETF) respectively.

(2) Dual tone multi frequency (DTMF): It is signaling between a telephone set and a switch in a telephone system.

(3) Multi control unit (MCU): It is a dedicated multimedia information switch for a video meeting.

(4) Client: It is an application (APP) running in a terminal for providing various services, such as a video playback client, a game client, and a meeting client.

(5) In response to: It is used for representing conditions or states on which the executed operation relies. If the conditions or states are satisfied, one or more executed operations may be real-time or have a set delay. There is no limit to a sequence on the plurality of executed operations unless otherwise specified.

Figure 1:
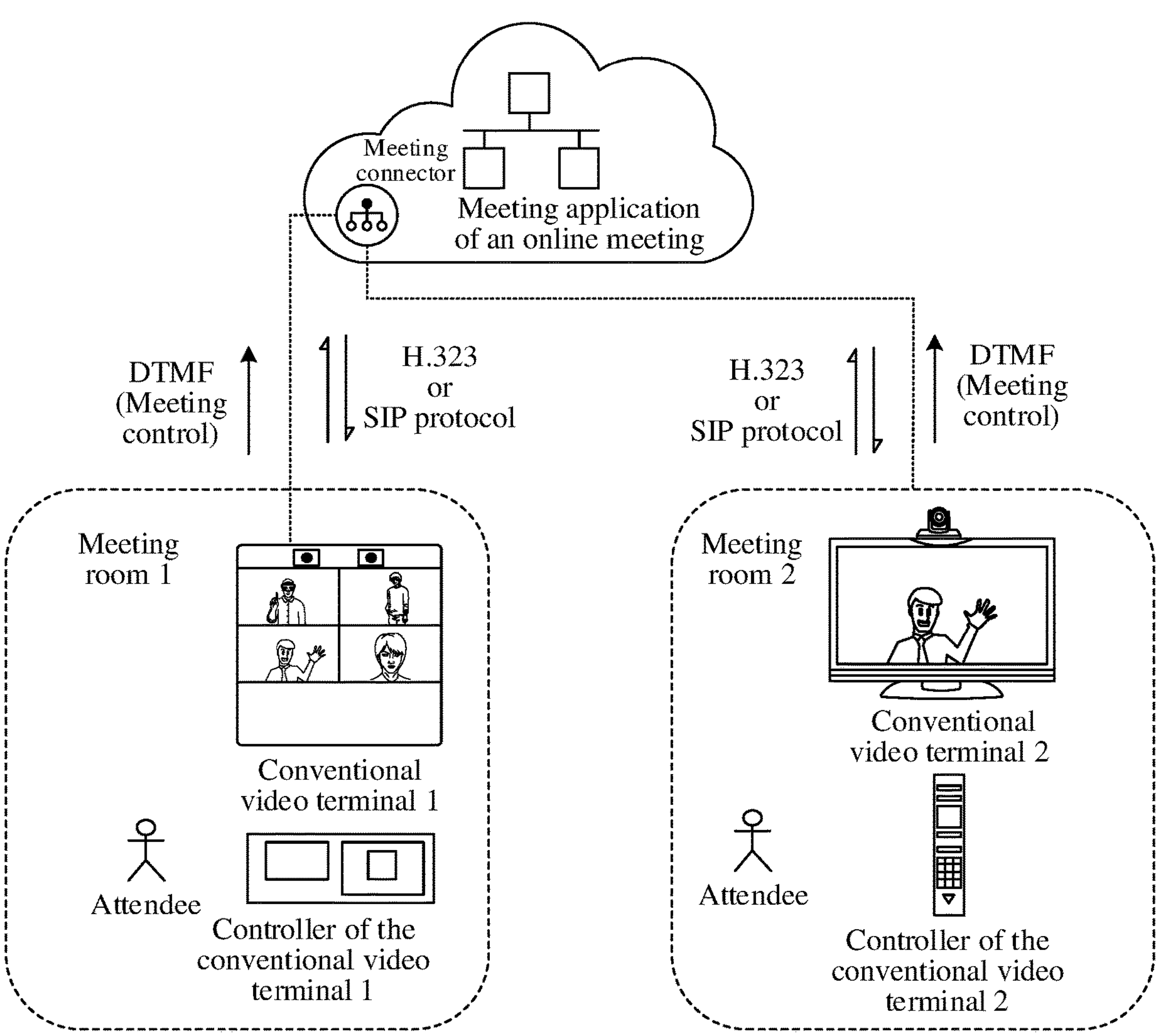
FIG. 1 is a schematic diagram of an architecture of a meeting control system according to an embodiment of the present disclosure.

FIG. 1 is a schematic diagram of an architecture of a meeting control system according to an embodiment of the present disclosure. As shown in FIG. 1, a meeting room device (that is, a meeting display terminal) of a conventional video meeting manufacturer, such as a conventional video terminal 1 in a meeting room 1 and a conventional video terminal 2 in a meeting room 2, connects to an online meeting by using a meeting connector (a gateway) and controls the meeting room device by using a controller (such as a remote control or a keyboard) corresponding to the conventional video terminal. The meeting room device communicates with the meeting connector via the standard H.323 or SIP protocol, but the H.323/SIP protocol does not define meeting control messages such as turning on/off a microphone or camera and switching layout, for an online meeting. In a related art, to assist in transmission of the meeting control messages, a DTMF message is used, and the transmission is implemented by using a remote control and a customized key combination. For example, if a meeting room attendee wants to turn on the microphone, the attendee may press a "*2" key combination on the remote control, and when a video terminal controller receives a trigger operation for the key combination, the key combination may be transmitted to the meeting connector (gateway) via the DTMF message, and the meeting connector translates the DTMF message to obtain a corresponding mute/unmute operation.

It can be learned that this manner is implemented by the remote control or keyboard and by using a combination such as 0 to 9, *, and #. This requires an operator to be familiar with meanings of different remote controls, different keyboards, and different key combinations, is incomprehensible and unintuitive, and requires a user to spend a lot of time learning the key combinations. In addition, the manner may only be used for simple meeting control, such as turning on/off a microphone or a camera. If complex operations such as applying to be a host, managing a list of meeting attendees, and switching layout need to be performed, due to a large amount of interactive information, when a key operation is used, interactive menus need to be superimposed on a meeting video interface, and a cursor needs to be moved up and down to select. This is very inconvenient, resulting in low efficiency of a control operation of the meeting.

In addition, during a gateway compatibility test, the applicant finds that there are irregularities in DTMF messages of some hardware manufacturers, and the meeting connector is not capable of successfully parsing the DTMF messages. Alternatively, when the gateway is called by using an MCU device, the MCU does not support a DTMF operation or is inconvenient to perform the DTMF operation. This makes it impossible to control a meeting locally after using the conventional video meeting device to connect to the online meeting, thereby cannot attending the meeting normally.

Based on this, the embodiments of the present disclosure provide a meeting control method to control, with the help of an operation control in a control interface of a control terminal, a target meeting in the meeting room device (that is, the meeting display terminal) of the conventional video meeting manufacturer, to solve at least the foregoing technical problems.

Figure 2:
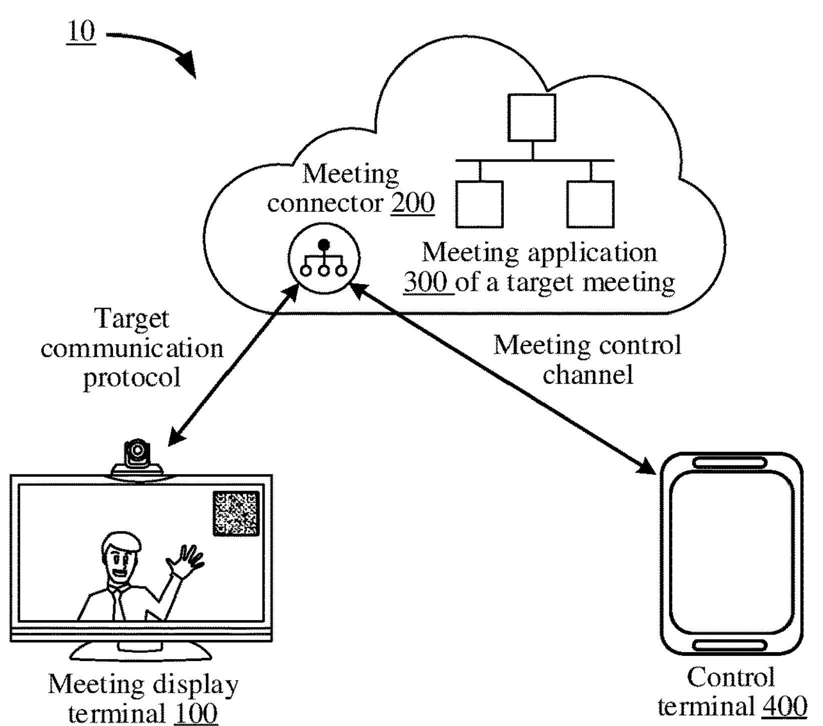
FIG. 2 is a schematic diagram of an architecture of another meeting control system according to an embodiment of the present disclosure.

FIG. 2 is a schematic diagram of an architecture of a meeting control system 10 according to an embodiment of the present disclosure. To support an exemplary application, a meeting display terminal 100 of a conventional video meeting manufacturer is connected to a meeting application 300 corresponding to a target meeting (an online meeting) by a meeting connector 200, and during displaying the target meeting on the meeting display terminal 100, a target attendee (an attendee corresponding to the meeting display terminal) controls the target meeting displayed in the meeting display terminal 100 by using a control terminal 400. The meeting display terminal 100 and the meeting connector 200 may be directly or indirectly connected via a wired or wireless communication mode, and the control terminal 400 and the meeting connector 200 may be directly or indirectly connected via a wired or wireless communication mode. This is not limited in the present disclosure. For example, the meeting display terminal 100 is connected to the meeting connector 200 via a target communication protocol (such as the H.323/SIP protocol), the control terminal 400 is connected to the meeting connector 200 through a meeting control channel, and the meeting connector 200 is a gateway of a device with a target communication protocol (such as the H.323/SIP).

The control terminal 400 may be various types of user terminals, such as smart phones, tablet computers, and laptop computers, and may also be a desktop computer, a television, or any combination of two or more of the data processing devices. The meeting application 300 may be integrated on a server corresponding to the online meeting. The server may be an independent physical server, or a server cluster or distributed system including a plurality of physical servers, or a cloud server providing basic cloud computing services, such as a cloud service, a cloud database, cloud computing, a cloud function, cloud storage, a network service, a cloud communication, a middleware service, a domain name service, a security service, a content delivery network (CDN), and a big data and artificial intelligence platform. The terminal may be a smart phone, a tablet computer, a notebook computer, a desktop computer, a smart speaker, a smartwatch, or the like, but is not limited thereto.

In an exemplary embodiment, when a target attendee attends the target meeting by using the meeting display terminal 100, a meeting interface of the target meeting is displayed in the meeting display terminal 100. The meeting interface is used for at least two attendees to engage in an online conversation. The target attendee may control the target meeting displayed in the meeting display terminal 100 by using the control terminal 400. For example, the control terminal 400 displays, in response to a control connection instruction for the target meeting, a control interface for controlling the target meeting; displays an operation control for controlling the target meeting in the control interface; performs, in response to a meeting control instruction triggered based on the operation control, a meeting control operation indicated by the meeting control instruction on the target meeting, and feeds back a meeting control operation result corresponding to the meeting control operation to the meeting display terminal 100 for displaying.

Figure 3:
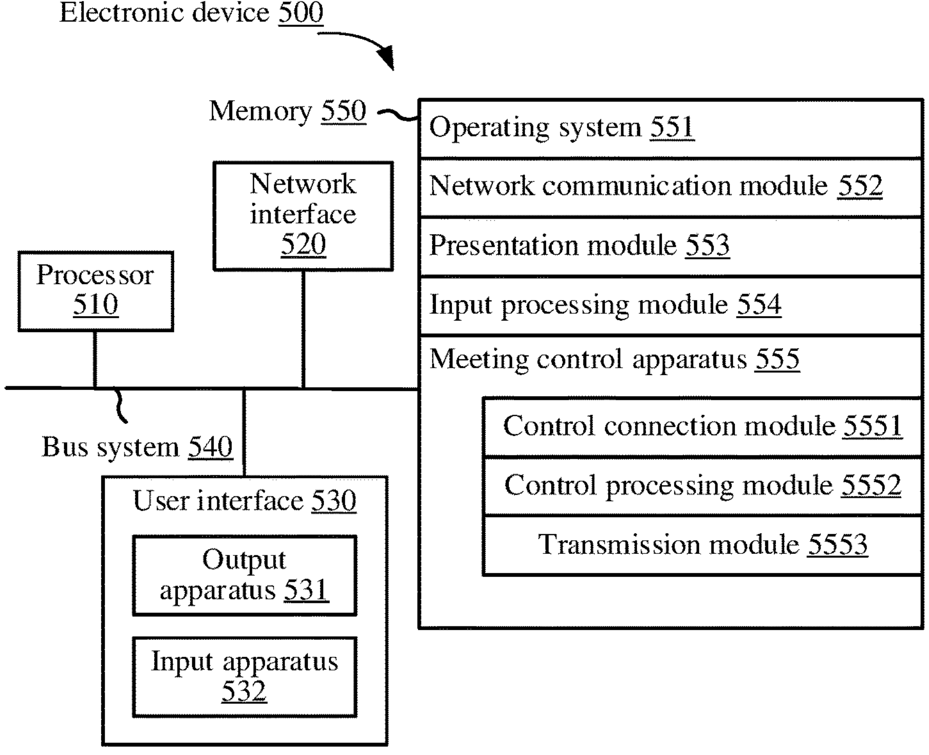
FIG. 3 is a schematic diagram of a structure of an electronic device according to an embodiment of the present disclosure.

FIG. 3 is a schematic diagram of a structure of an electronic device 500 according to an embodiment of the present disclosure. In an exemplary embodiment, the electronic device 500 may be the control terminal 400 or the meeting display terminal 100 in FIG. 2. Taking the electronic device being the control terminal 400 as shown in FIG. 1 as an example, the electronic device implementing the meeting control method in the embodiments of the present disclosure is described. The electronic device 500 as shown in FIG. 3 includes: at least one processor 510, a memory 550, at least one network interface 520, and a user interface 530. Components of the electronic device 500 are coupled together via a bus system 540. The bus system 540 is configured to implement connections and communication between the components. In addition to a data bus, the bus system 540 further includes a power bus, a control bus, and a state signal bus. However, for ease of clear description, various buses are marked as the bus system 540 in FIG. 3.

The processor 510 may be an integrated circuit chip with a signal processing capability, such as a general-purpose processor, a digital signal processor (DSP), or another programmable logic device, a discrete gate or a transistor logic device, or discrete hardware component. The general-purpose processor may be a microprocessor, any conventional processor, or the like.

The user interface 530 includes one or more output apparatuses 531 that present media content, including one or more loudspeakers and/or one or more visual display screens. The user interface 530 further includes one or more input apparatuses 532 including user interface members that help user input, such as a keyboard, a mouse, a microphone, a touch display screen, a camera, other input buttons and controls.

The memory 550 may be removable, non-removable, or combination thereof. For example, a hardware device includes a solid-state memory, a hard disk drive, an optical drive, and the like. The memory 550 optionally includes one or more storage devices physically located away from the processor 510.

The memory 550 may include a volatile memory or a non-volatile memory, or may include both the volatile memory and the non-volatile memory. The non-volatile memory may be a read only memory (ROM), and the volatile memory may be a random access memory (RAM). The memory 550 described in the embodiments of the present disclosure is intended to include any suitable type of memories.

In some embodiments, the memory 550 is capable of storing data to support various operations. For example, the data includes a program, a module, a data structure, or a subset or superset thereof. Examples are described below.

An operating system 551 includes system programs for processing various basic system services and performing hardware-related tasks, for example, a frame layer, a core library layer, and a drive layer, and is used for implementing various basic services and processing hardware-based tasks.

A network communication module 552 is configured to reach another electronic device via one or more (wired or wireless) network interfaces 520. For example, the network interface 520 includes: Bluetooth, wireless compatibility certification (Wi-Fi), a universal serial bus (USB), and the like.

A presentation module 553 is configured to present information by one or more output apparatuses 531 (for example, display screens and speakers) associated with the user interface 530 (for example, a user interface configured to operate a peripheral device and display content and information).

An input processing module 554 is configured to detect one or more user inputs or interactions from the input apparatus 532 and translate the detected inputs or interactions.

In some embodiments, a meeting control apparatus provided in this embodiment of the present disclosure may be implemented in a software manner. FIG. 3 shows a meeting control apparatus 555 stored in the memory 550. The meeting control apparatus 555 may be arranged in the control terminal 400, and may be software in the form of a program, a plug-in, and the like. The meeting control apparatus 555 includes the following software modules: a control connection module 5551, a control processing module 5552, and a transmission module 5553 that are logical. Therefore, arbitrary combination or splitting may be performed according to implemented functions. The functions of the modules are described below.

In some embodiments, the memory 550 in the electronic device 500 may further include a meeting control apparatus 556. The meeting control apparatus 556 may be arranged in the meeting display terminal 100, and the meeting control apparatus 556 may include an entry display module and a communication connection module which are logical. Therefore, arbitrary combination or splitting may be performed according to implemented functions. The functions of the modules are described below.

In some other embodiments, the meeting control apparatus provided in this embodiment of the present disclosure may be implemented in a hardware manner. As an example, the meeting control apparatus provided in this embodiment of the present disclosure may be a processor in the form of a hardware decoding processor. The processor is programmed to perform the meeting control method provided in this embodiment of the present disclosure. For example, the processor in the form of a hardware decoding processor may use one or more application-specific integrated circuits (ASICs), DSPs, programmable logic devices (PLDs), complex programmable logic devices (CPLDs), field-programmable gate arrays (FPGAs), or other electronic components.

In some embodiments, the control terminal or the meeting display terminal may perform the meeting control method provided in this embodiment of the present disclosure by running a computer program. For example, the computer program may be a native program or a software module in an operating system; may be a local APP, that is, a program that needs to be installed in the operating system to run, such as a livestreaming APP or a meeting APP; or may be a mini program, that is, a program that only needs to be downloaded into a browser environment to run; or may be a mini program that may be embedded in any APP. In summary, the foregoing computer program may be any form of application, module, or plug-in.

Figure 4:
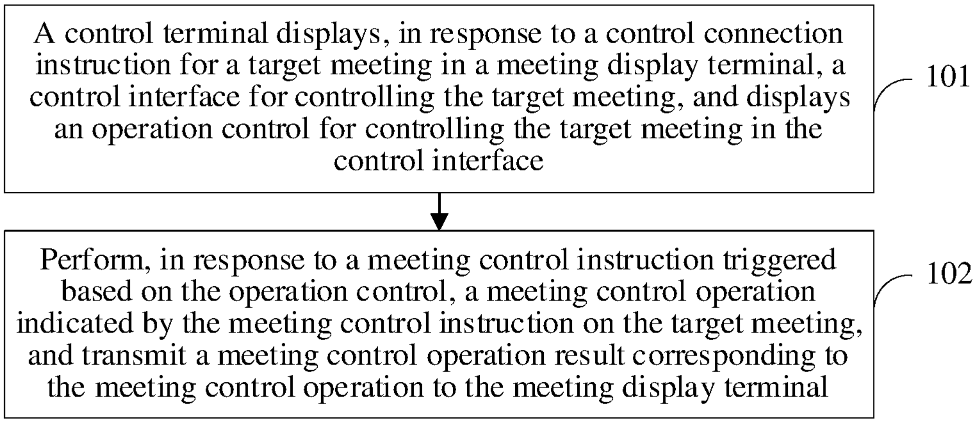
FIG. 4 is a schematic flowchart of a meeting control method according to an embodiment of the present disclosure.

Based on the foregoing description of the meeting control system provided in this embodiment of the present disclosure, the meeting control method provided in this embodiment of the present disclosure is described below. In an actual implementation, the method may be implemented separately by the control terminal 400, the meeting display terminal 100, or the meeting connector 200 shown in FIG. 2, and may alternatively be implemented collaboratively by the control terminal 400, the meeting display terminal 100, and the meeting connector 200 shown in FIG. 2. Next, with reference to FIG. 2 and FIG. 4, FIG. 4 is a schematic flowchart of a meeting control method according to an embodiment of the present disclosure. An example in which the control terminal 400 shown in FIG. 2 implements the meeting control method provided in this embodiment of the present disclosure separately is used for description.

Step 101: A control terminal displays, in response to a control connection instruction for a target meeting in a meeting display terminal, a control interface for controlling the target meeting, and displays an operation control for controlling the target meeting in the control interface.

The meeting display terminal may be a conventional video terminal or a meeting room device provided by a video meeting manufacturer, and the meeting display terminal may be connected to a meeting application corresponding to the target meeting by using the meeting connector without replacing an original hardware device. The meeting application corresponding to the target meeting is audio and video meeting software that has functions such as multi-user online meeting, one-click access to the whole platform, and intelligent noise reduction of audio and video. The software provides real-time screen sharing and supports online document collaboration, satisfying increasing needs of users for cloud office. During an attendee attending the target meeting by using the meeting display terminal, to improve convenience and efficiency of target meeting control in the meeting display terminal, in this embodiment of the present disclosure, the target meeting in the meeting display terminal is controlled by the control terminal. The control terminal has functions such as screen display and touch, and has convenience of operation, for example, may be a user terminal such as a smart phone and a tablet computer.

For example, a meeting application is set up in the meeting display terminal, and based on the meeting application, the meeting display terminal connects to (that is, joins) the target meeting. The target meeting may be a specific meeting initiated by an attended user. In some embodiments, the control terminal may receive the control connection instruction for the target meeting displayed in the meeting display terminal (that is, the target meeting to which the meeting display terminal is connected) before displaying the control interface for controlling the target meeting. The control connection instruction is triggered by a connection control entry displayed in the meeting display terminal, and is used for instructing an establishment of a communication connection between the meeting display terminal and the control terminal. The communication connection is used for the control terminal to control, via the communication connection, the target meeting to which the meeting display terminal is connected. The connection control entry is used for the meeting display terminal to be connected to the control terminal for controlling the target meeting.

When a target attendee (an attendee in the target meeting corresponding to the meeting display terminal) attends the target meeting by using the meeting display terminal, the connection control entry for connecting the control terminal may be displayed in the meeting display terminal (where In an exemplary embodiment, the connection control entry may be presented in different forms, such as in the form of a key and the form of a link). In an exemplary embodiment, the target attendee may perform a trigger operation (such as clicking and double-clicking) for the connection control entry, and the meeting display terminal transmits the connection control instruction to the control terminal in response to the trigger operation. After receiving the connection control instruction, the control terminal may establish the communication connection between the control terminal and the meeting display terminal in response to the connection control instruction, and control, via the established communication connection, the target meeting displayed in the meeting display terminal.

In some embodiments, the control terminal may receive the control connection instruction for the target meeting displayed in the meeting display terminal in the following manner: The control terminal receives the control connection instruction in response to a scanning operation for a graphic code used as the connection control entry, and the graphic code is in a meeting interface of the target meeting displayed in the meeting display terminal. In other words, the meeting display terminal displays the meeting interface of the target meeting. The meeting interface is used for at least two attendees to engage in an online conversation. The meeting display terminal displays, in the meeting interface, a graphic code corresponding to the target meeting, and uses the graphic code as the connection control entry. The control terminal receives the control connection instruction in response to the scanning operation for the graphic code.

During the target attendee attending the target meeting by using the meeting display terminal, a meeting interface for the target attendee to attend the target meeting to engage an online meeting with another attendee is displayed in the meeting display terminal, and attendees may engage in an online conversation in the meeting interface. The online conversation includes at least one of the following: an audio conversation, a video conversation, and a livestreaming conversation. The meeting interface displayed in the meeting display terminal may be an interactive interface of an ongoing online meeting in a meeting application or an interactive interface in a livestreaming application, such as an interactive interface of an online conversation between a livestreamer and an audience in a livestreaming connection.

Figure 5:
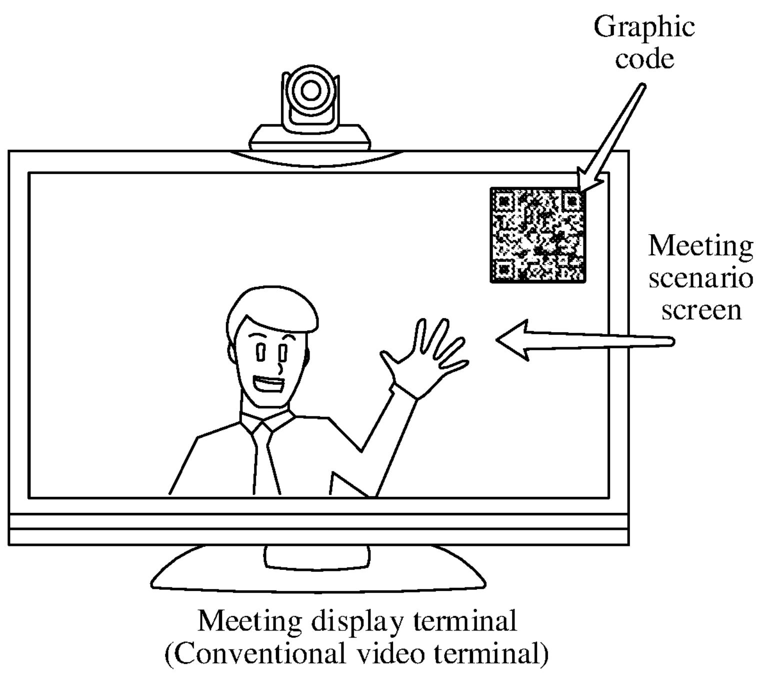
FIG. 5 is a schematic diagram of display of a meeting interface according to an embodiment of the present disclosure.

FIG. 5 is a schematic diagram of display of a meeting interface according to an embodiment of the present disclosure. A meeting scenario screen of a target meeting may be displayed in the meeting interface displayed in the meeting display terminal. The meeting scenario screen may be a real meeting scenario (such as a real meeting room and a real meeting person) or a virtual meeting scenario (such as a virtual meeting room and a virtual role corresponding to a real attendee). In addition, the graphic code that may be used for connecting the control terminal may also be displayed in the meeting interface, and when the control terminal scans the graphic code, the control connection instruction can be received. The control connection instruction instructs to establish the communication connection between the control terminal and the meeting display terminal, so that the target meeting displayed in the meeting display terminal is controlled via the established communication connection. The graphic code may be a two-dimensional code, a barcode, or another form, and a form of the graphic code is not limited in this embodiment of the present disclosure.

In some embodiments, the meeting display terminal may display, in the meeting interface, the graphic code corresponding to the target meeting in the following manner: The meeting display terminal determines a connection moment when a meeting application corresponding to the target meeting is connected, and displays, in the meeting interface, the graphic code corresponding to the target meeting during a target time period starting from the connection moment. Alternatively, the meeting display terminal displays, in the meeting interface, the graphic code corresponding to the target meeting periodically during displaying the meeting interface.

During the meeting, the graphic code may be displayed in the meeting interface in real time, so that the target attendee can adjust, based on the graphic code at any time, the target meeting in the meeting display terminal to be controlled by the control terminal. This improves convenience and efficiency of meeting control. Certainly, the graphic code may also be displayed selectively in the meeting interface, for example, the graphic code is only displayed within the target time period (such as 30 seconds) after the meeting display terminal is connected to the meeting application of the target meeting, or the graphic code is displayed periodically (such as every two minutes) in the meeting interface. In this way, the graphic code can be avoided to displayed in the meeting interface all the time, so that display resources are reduced, and utilization rate of the display resources is improved, thereby avoiding occupation of the meeting interface, and improving meeting experience.

In some embodiments, the meeting display terminal may display, in the meeting interface, the graphic code corresponding to the target meeting in the following manner: The meeting display terminal receives a call-out instruction for the graphic code of the target meeting from a remote control device during displaying the meeting interface in the meeting display terminal; and calls out the graphic code in response to the call-out instruction, and displays the graphic code in the meeting interface.

In some embodiments, the foregoing remote control device may be a control terminal or other terminals independent of the control terminal.

During the meeting, the graphic code may also be hidden in the meeting interface, and the target attendee may call out the graphic code at any time by using the remote control device configured to control the meeting display terminal, to display the graphic code called out in the meeting interface. In this way, the graphic code can be avoided to be displayed in the meeting interface all the time. This not only reduces display resources, improves utilization rate of the display resources, but also avoids occupation of the meeting interface, and improves meeting experience.

In some embodiments, the meeting display terminal may display, in the meeting interface, the graphic code corresponding to the target meeting in the following manner: displaying a call-out control for calling out the graphic code in the meeting interface during displaying the meeting interface in the meeting display terminal; and calling out the graphic code in response to a trigger operation for the call-out control, and displaying the graphic code in the meeting interface.

During the meeting, the graphic code may not be displayed in the meeting interface in real time, but the call-out control for calling out the graphic code is displayed in the meeting interface. The target attendee may call out the graphic code at any time by using the call-out control to display the call-up graphic code in the meeting interface. Because the call-out control occupies a smaller area in the meeting interface than the graphic code, this not only reduces the display resources and improves the utilization rate of the display resources, but also prevents the graphic code with a larger area from occupying the meeting interface, and improves the meeting experience.

In some embodiments, the control terminal may receive the control connection instruction for the target meeting displayed in the meeting display terminal in the following manner: receiving the control connection instruction for the target meeting transmitted by the meeting display terminal, the control connection instruction being triggered by the meeting display terminal in response to a selection operation for the searched control terminal; in other words, displaying the meeting interface of the target meeting in the meeting display terminal, and displaying a search control for searching for the terminal in the meeting interface, to use the search control as the connection control entry; displaying, by the meeting display terminal in response to a trigger operation for the search control, at least one terminal for controlling the target meeting, the at least one terminal being registered with a meeting control service for controlling the target meeting; determining, by the meeting display terminal in response to a selection operation on a target terminal, the target terminal as the control terminal, and transmitting the control connection instruction for the target meeting to the control terminal; and receiving, by the control terminal, the control connection instruction for the target meeting transmitted by the meeting display terminal.

The search control is displayed in the meeting interface displayed in the meeting display terminal. The meeting display terminal displays, in response to the trigger operation for the search control, one or more (two or more) terminals that may be selected in the meeting interface of the meeting display terminal. The user may select the target terminal as the control terminal, and transmit the connection control instruction for the target meeting to the control terminal, so that the control terminal receives the connection control instruction. The at least one terminal that may be selected may be displayed in a terminal selection interface. The terminal selection interface may be presented in various ways, such as presenting in the meeting interface in the form of a pop-up window, or redirecting to the terminal selection interface from the current meeting interface.

In addition, when the control terminal is selected, a search request for a network service may be triggered by the remote control device corresponding to the meeting display terminal. The remote control device is provided with a control key that may be operated by the user, and the user may trigger the search request for the network service based on the control key. Alternatively, the user may trigger the search request for the network service by using a voice function key of the remote control device. For example, the user may enable a voice collection function of the remote control device by pressing and holding the voice function key, so that the remote control device can receive voice content inputted by the user, to trigger the search request for the network service based on the voice content. When the search request for the network service is received, the meeting display terminal displays, in response to the search request, one or more (two or more) terminals that may be selected in the meeting interface. The user may select the target terminal as the control terminal, and transmit the connection control instruction for the target meeting to the control terminal, so that the control terminal receives the connection control instruction.

In an exemplary embodiment, the foregoing determined control terminal is a terminal device of the network service and the meeting control service searched by the registered meeting display terminal. The meeting control service is a service that can control the target meeting, such as a representational state transfer API (RestAPI) service, through which control operations such as turning on/off a microphone, turning on/off a camera, and switching layout may be performed on a meeting interface of attendees attending the target meeting. The network service is a service that can be used for discovering an application on a neighboring terminal in a small range of a network, such as a network service discovery (NSD) protocol of Android. When the communication connection between the control terminal and the meeting display terminal is established, the control terminal is used as an NSD server, and the meeting display terminal is used as an NSD client. The control terminal first defines a host name and a port number, and then performs NSD registration. The meeting display terminal performs terminal scanning in response to a search request for NSD, obtains a network address and a port number of the control terminal when the host name of the control terminal is scanned, and then requests to establish the communication connection with the control terminal. When the control terminal agrees to connect, a near field wireless communication connection between the meeting display terminal and the control terminal can be established. In this way, when the control terminal performs a meeting control operation indicated by a meeting control instruction on the target meeting, after a meeting control operation result corresponding to the meeting control operation is determined based on the meeting control operation, the meeting control operation result may be transmitted to the meeting display terminal via the established near field wireless communication connection, so that the meeting control operation result is displayed in the meeting display terminal.

In some embodiments, before displaying the control interface for controlling the target meeting, the control terminal may receive the control connection instruction for the target meeting displayed in the meeting display terminal in the following manner: displaying, when the control terminal is provided with a meeting control service for controlling the target meeting, a meeting query interface for querying a meeting; displaying, in response to a determining operation on a meeting identifier for the target meeting inputted based on the meeting query interface, at least one attendee corresponding to the target meeting; and receiving, in response to a selection operation on a target attendee corresponding to the meeting display terminal in the at least one of attendees, the control connection instruction for the target meeting displayed in the meeting display terminal.

The control terminal is provided with the meeting control service for controlling the target meeting, which refers to a program that can provide the meeting control service installed in an operating system of the control terminal, or may refer to a program that can run and provide the meeting control service that only needs to be downloaded in a browser environment, or may refer to a mini program that can provide the meeting control service that can be embedded in any APP in the control terminal. The meeting control service is a service that can control the target meeting, the control operations such as turning on/off a microphone, turning on/off a camera, and switching layout may be performed on a meeting interface of attendees attending the target meeting.

When the meeting control service is turned on by using the control terminal, the meeting query interface for querying an online meeting may be displayed in the control terminal. An editing area for entering a meeting identifier (or a meeting number) may be displayed in the meeting query interface. After receiving the meeting identifier of the target meeting entered by the user in the editing area, the control terminal can connect to the target meeting and display information of the attendee of the target meeting, such as attendee information of at least one attendee attending the target meeting, a name, an account number, and a terminal device of each attendee (a device for attending the target meeting). A terminal device that can facilitate meeting control (such as a smart phone) and a terminal device that cannot facilitate meeting control (that is, the meeting room device of the conventional video meeting manufacturer, such as the meeting display terminal in this embodiment of the present disclosure) may be displayed differently, so that the user can quickly find a terminal device that needs to be controlled by the control terminal, thereby improving efficiency of meeting control.

When an attendee selects a target attendee who uses the meeting display terminal from the at least one of the attendees, the control terminal can receive the control connection instruction triggered by the selection operation, and establish the communication connection between the control terminal and the meeting display terminal in response to the control connection instruction, to call an open interface (such as RestAPI) provided by the meeting application corresponding to the target meeting to control the target meeting in the meeting display terminal.

In the embodiments of the present disclosure, data related to the target meeting is involved. For example, the attendee information is essentially user-related data. When the embodiments of the present disclosure are applied to products or technologies, user permission or consent needs to be obtained, and collection, use, and processing of related data need to comply with relevant laws, regulations and standards of relevant countries and regions.

In some embodiments, before displaying the control interface for controlling the target meeting, the control terminal may receive the control connection instruction for the target meeting displayed in the meeting display terminal in the following manner: displaying, when the control terminal is provided with the meeting control service for controlling the target meeting, an information editing interface in response to an open operation for the meeting control service, and displaying, in the information editing interface, a pairing code corresponding to the meeting display terminal; and receiving, in response to an editing determining operation on the pairing code triggered based on the information editing interface, the control connection instruction for the target meeting displayed in the meeting display terminal.

When the control terminal is provided with the meeting control service for controlling the target meeting and the meeting control service is run, the information editing interface is displayed. In the information editing interface, an editing area and the pairing code of the meeting display terminal for guiding the user to enter may be displayed, the pairing code is randomly generated and assigned to the meeting display terminal in a background, and the user may enter the pairing code in the editing area and click the OK key. When a determining operation for the inputted pairing code is received, the control terminal can receive the control connection instruction triggered by the determining operation, and establish the communication connection between the control terminal and the meeting display terminal in response to the control connection instruction, to call the open interface provided by the meeting application corresponding to the target meeting to control the target meeting in the meeting display terminal.

In some embodiments, before displaying the control interface for controlling the target meeting, the control terminal may establish the communication connection with the meeting display terminal in the following manner: establishing a meeting control channel to the meeting connector, the meeting connector being connected to a meeting application corresponding to the target meeting via a target communication protocol; and establishing the communication connection with the meeting display terminal based on the target communication protocol and the meeting control channel. In other words, the meeting display terminal is connected, by using the meeting connector, to the meeting application corresponding to the target meeting, and the meeting display terminal is connected to the meeting connector via the target communication protocol. The meeting control channel is established to the meeting connector. The communication connection is established with the meeting display terminal based on the target communication protocol and the meeting control channel.

In an exemplary embodiment, the meeting display terminal is the meeting room device of the conventional video meeting manufacturer. The meeting display terminal is connected to the meeting application corresponding to the target meeting by using the meeting connector without replacing an original hardware device. The meeting display terminal is connected to the meeting connector via the target communication protocol (such as H.323/SIP protocol), and the meeting connector is a gateway of a device with the target communication protocol (such as H.323/SIP protocol). The control terminal establishes the meeting control channel between the control terminal and the meeting connector in response to the control connection instruction, and can establish the communication connection between the meeting display terminal and the control terminal based on the target communication protocol between the meeting display terminal and the meeting connector, and based on the meeting control channel between the terminal and the meeting connector. In this way, after performing the meeting control operation on the target meeting in response to the meeting control instruction for the target meeting, the control terminal transmits the meeting control operation to the meeting connector through the meeting control channel, so that the meeting connector determines a meeting control operation result corresponding to the meeting control operation based on the meeting control operation, and transmits the meeting control operation result to the meeting display terminal via the target communication protocol, to display the meeting control operation result in the meeting display terminal.

In the foregoing manner, after establishing the communication connection between the control terminal and the meeting display terminal in response to the control connection instruction, the control terminal can display the control interface for controlling the target meeting, display the operation control for controlling the target meeting in the control interface, and can perform the corresponding meeting control operation on the target meeting in the meeting display terminal by using the operation control.

In some embodiments, a quantity of the operation control used for controlling the target meeting may be one or more (that is, at least two). When there are a plurality of operation controls, each operation control may correspond to a control function, and the target attendee may trigger a corresponding meeting control instruction by triggering a corresponding operation control. For example, the control function may be a volume control function, and the corresponding operation control is a volume operation control for controlling volume of the target meeting in the meeting display terminal, and when the volume operation control is triggered, control of the volume of the target meeting in the meeting display terminal is triggered. The control function may be a permission application function, and the corresponding operation control is a permission operation control for applying for specific permission (such as host permission) in the target meeting, and when the permission operation control is triggered, the permission application for the target meeting in the meeting display terminal is triggered. When the quantity of the operation control is one, different functions of the target meeting in the meeting display terminal may be controlled based on the operation control. For example, when the target attendee performs a trigger operation for the operation control, a corresponding function item (such as volume adjustment, screen recording, audio/video ON/OFF, interface/document sharing, and file transferring) may be selected, and then a corresponding meeting control instruction is triggered after the corresponding function item is selected.

Step 102: Perform, in response to the meeting control instruction triggered based on the operation control, the meeting control operation indicated by the meeting control instruction on the target meeting, and transmit the meeting control operation result corresponding to the meeting control operation to the meeting display terminal.

The meeting control instruction is used for instructing the meeting control operation performed on the target meeting displayed in the meeting display terminal, in other words, to instruct the meeting control operation to be performed on the target meeting to which the meeting display terminal is connected. For example, meeting control operations such as turning on/off a microphone, turning on/off a camera, and switching layout are performed on the meeting interface of the target meeting displayed in the meeting display terminal. Alternatively, permission of a meeting host is applied in a name of the target attendee corresponding to the meeting display terminal, to perform the meeting control operation on the target meeting. After performing the meeting control operation, the control terminal transmits the meeting control operation result of the meeting control operation to the meeting display terminal in real time to display a corresponding meeting control operation result in the meeting display terminal.

In an exemplary embodiment, the meeting control operation result is a result of the meeting control operation performed by the control terminal. The meeting control operation result may indicate the meeting control operation that the control terminal performs on the target meeting. When the meeting display terminal displays the meeting control operation result, an attendee may be informed of a change that occurs in the current target meeting. For example, when the meeting control operation is used for muting the target meeting (that is, audio is turned off and no audio is outputted) on the meeting display terminal, a corresponding meeting control operation result may be a result prompt message used for prompting that the target meeting is muted. In an exemplary embodiment, the meeting control operation result may be displayed in different forms, such as one or more of a graphic, a text, a color, and a special effect.

In some embodiments, when a quantity of the operation control is at least two, a first display style is used to display a target operation control for performing a target type of meeting control operation on the target meeting, and a second display style different from the first display style is used to display other operation controls than the target operation control in the at least two operation controls. The meeting control instruction corresponding to the target type of meeting control operation is received in response to a trigger operation for the target operation control. The target type of meeting control operation indicated by the meeting control instruction is performed on the target meeting in response to the meeting control instruction, and a corresponding target type of meeting control operation result of the meeting control operation is displayed in the meeting display terminal.

Because there may be a plurality of operation controls to control the target meeting, such as a mute/unmute control, a camera on/off control, a layout switch control, an attendee management control, and a recording control, display styles of the operation controls with different functions may be different, for example, different operation controls are displayed by using different control identifiers, icons, indication information, and other display styles. When the user selects the target operation control, the control terminal may receive the meeting control instruction triggered by the selection operation to perform the target type of meeting control operation indicated by the target operation control on the target meeting, and displays the corresponding target type of meeting control operation result of the meeting control operation in the meeting display terminal.

Figure 6:
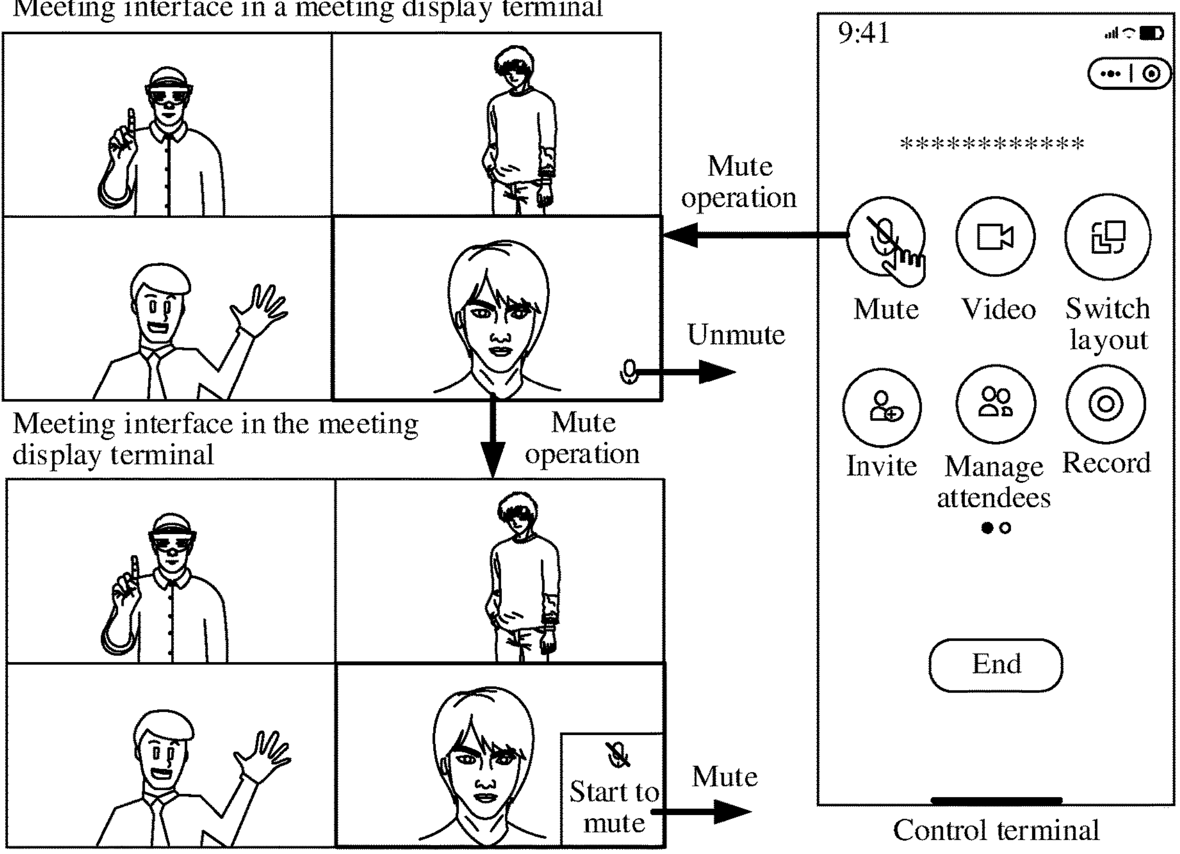
FIG. 6 is a schematic diagram of display of another meeting interface according to an embodiment of the present disclosure.

For example, FIG. 6 is a schematic diagram of display of a meeting interface according to an embodiment of the present disclosure. Before the control terminal performs a meeting control operation of "mute", a target attendee 601 corresponding to the meeting display terminal is in a non-mute state, and a non-mute prompt is displayed in a lower right corner of the target attendee 601. After the control terminal performs the "mute" operation on the target attendee, a mute prompt is displayed in the lower right corner of the target attendee 601 in the meeting interface in the meeting display terminal, such as "You have been muted", to inform other attendees in the target meeting that the target attendee is in a mute state.

Figure 7:
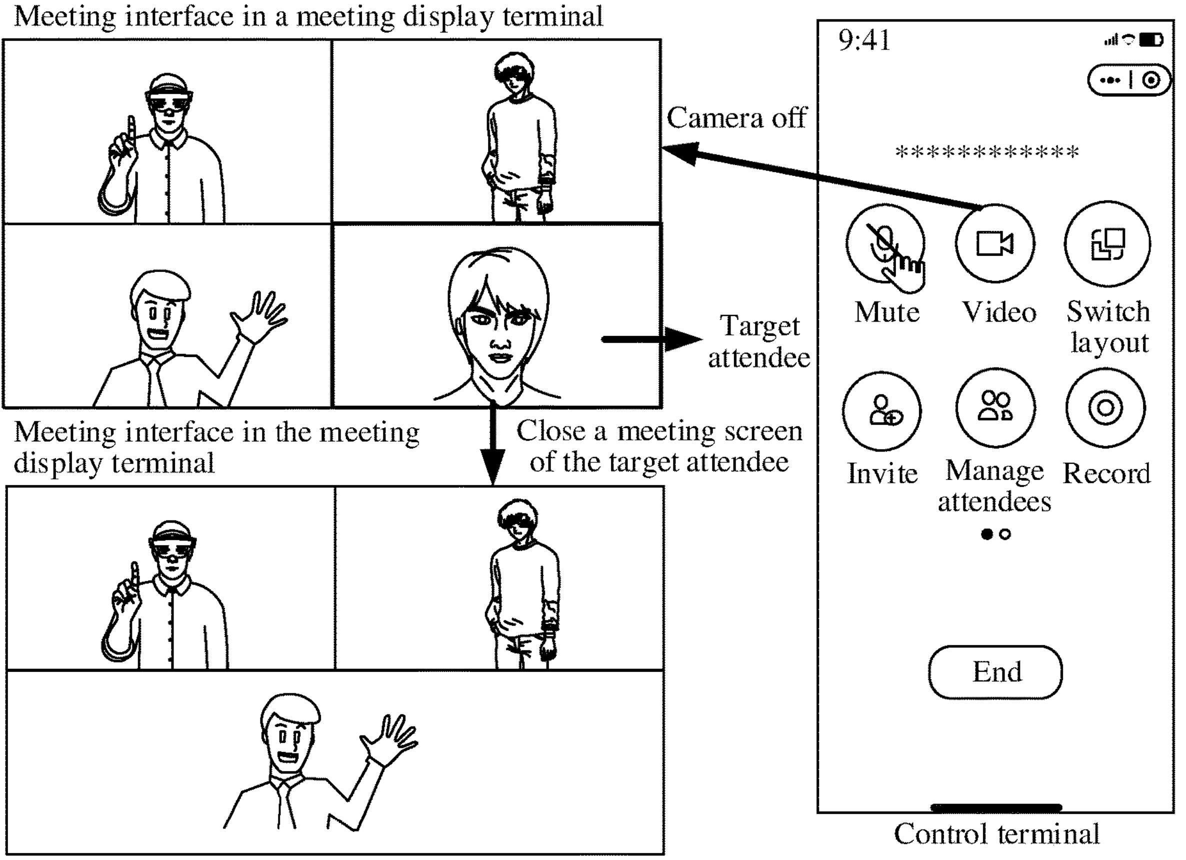
FIG. 7 is a schematic diagram of display of another meeting interface according to an embodiment of the present disclosure.

FIG. 7 is a schematic diagram of display of a meeting interface according to an embodiment of the present disclosure. Before the control terminal performs a meeting control operation of "camera off", a meeting screen of a target attendee 701 is displayed in the meeting interface in the meeting display terminal. After the control terminal performs the meeting control operation of "camera off" on the target attendee, the meeting screen of the target attendee 701 is not displayed in the meeting interface in the meeting display terminal.

Figure 8:
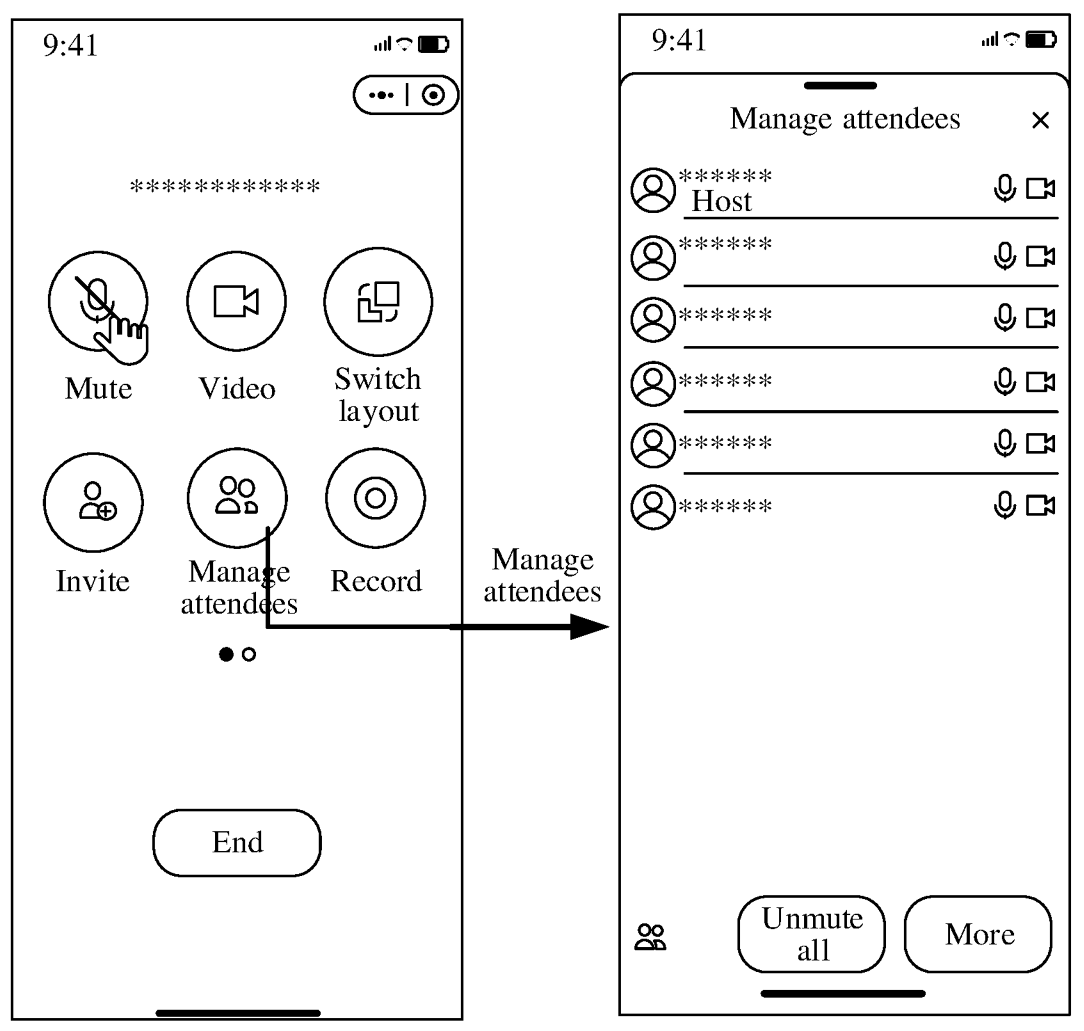
FIG. 8 is a schematic diagram of display of a control interface according to an embodiment of the present disclosure.

FIG. 8 is a schematic diagram of display of a control interface according to an embodiment of the present disclosure. The control terminal may apply for permission of a meeting host in the name of the target attendee corresponding to the meeting display terminal. When the permission of a meeting host is granted, attendees in the meeting can be managed, and the meeting control operation can be performed on the target meeting, such as muting/unmuting, turning on/off a camera, recording managing, and screen sharing permission.

In some embodiments, to implement the meeting control method provided in the embodiments of the present disclosure, the meeting display terminal displays a connection control entry. The connection control entry is used for connecting to a control terminal for controlling a target meeting. The meeting display terminal establishes a control connection with the control terminal in response to a control connection operation triggered based on the connection control entry. The control connection is used for the control terminal to control the target meeting. The meeting display terminal receives a meeting control operation result corresponding to a meeting control operation performed by the control terminal on the target meeting, and displays the meeting control operation result.

In some embodiments, the meeting display terminal may display the connection control entry in the following manner: displaying a meeting interface of the target meeting when the connection control entry is presented in the form of a graphic code, the meeting interface being used for at least two attendees to engage in an online conversation; and displaying a graphic code corresponding to the target meeting in the meeting interface.

In some embodiments, the meeting display terminal may display, in the meeting interface, the graphic code corresponding to the target meeting in the following manner: determining a connection moment when the meeting display terminal connects to a meeting application corresponding to the target meeting, and displaying, in the meeting interface, the graphic code corresponding to the target meeting during a target time period starting from the connection moment; or displaying, in the meeting interface, the graphic code corresponding to the target meeting periodically during displaying the meeting interface in the meeting display terminal.

In some embodiments, the meeting display terminal may display, in the meeting interface, the graphic code corresponding to the target meeting in the following manner: receiving, by the meeting display terminal, a call-out instruction for the graphic code of the target meeting from the control terminal during displaying the meeting interface in the meeting display terminal; and calling out the graphic code in response to the call-out instruction, and displaying the graphic code in the meeting interface.

In some embodiments, after displaying the connection control entry, when the connection control entry is a search control used for searching for a terminal, the meeting display terminal displays at least one searched terminal in response to a trigger operation for the search control. The at least one terminal includes the control terminal, and the terminal is registered with a meeting control service for controlling the target meeting. A selection operation is received for the control terminal, and the selection operation is determined as the control connection operation.

In the foregoing manner, when a meeting display terminal of a conventional video meeting manufacturer is connected to the meeting application (an online meeting) of the target meeting without replacing an original hardware device, the target meeting in the meeting display terminal is controlled with the help of the control interface in the control terminal. Because the control interface in the control terminal displays the operation control for controlling the target meeting, the operation control may be used for conveniently performing a corresponding meeting control operation on the target meeting and displaying the meeting control operation result corresponding to the meeting control operation in the meeting display terminal. This is convenient to operate and improves efficiency of the control operation of the meeting.

Figure 9:
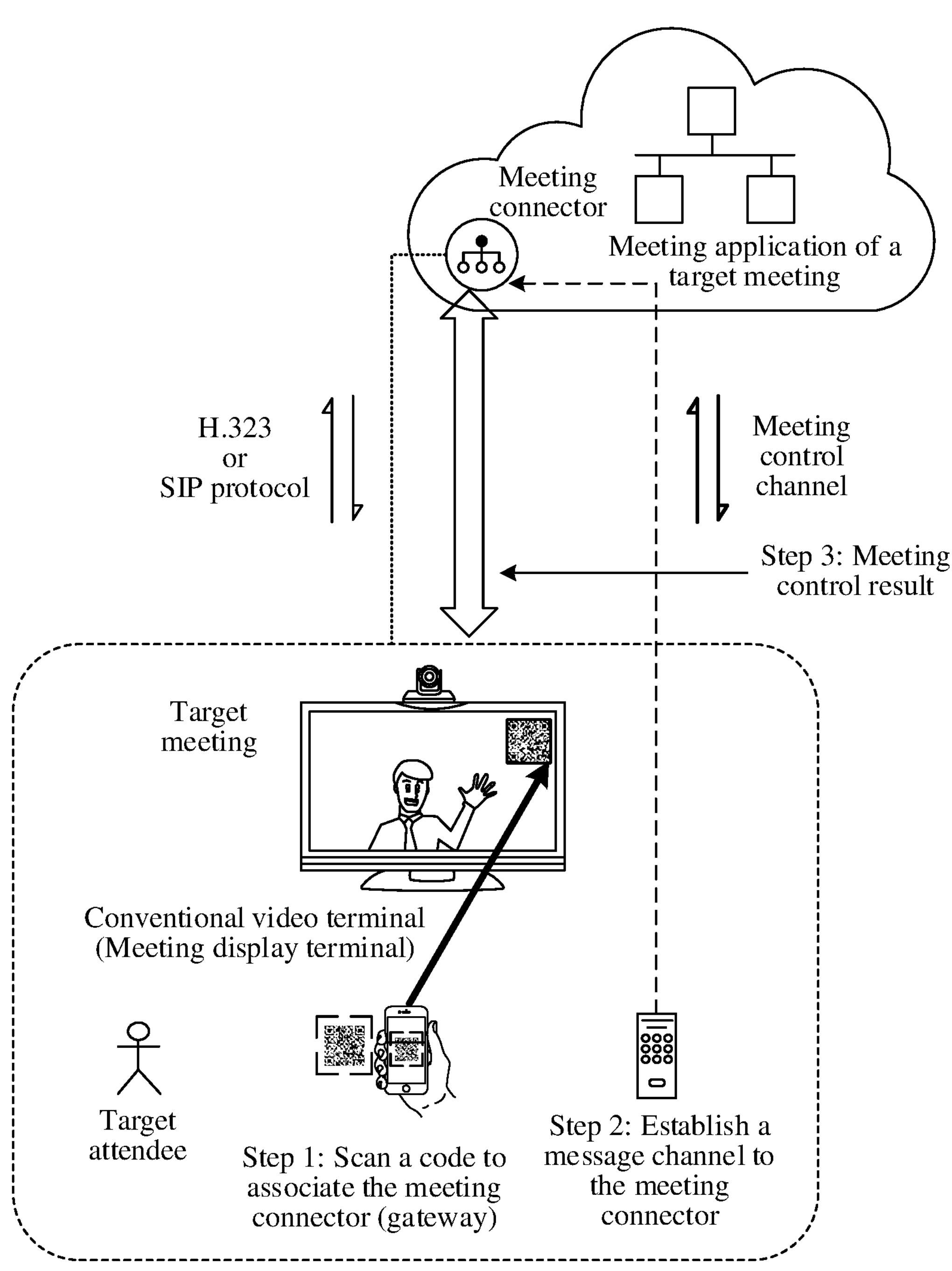
FIG. 9 is a schematic diagram of an architecture of another meeting control system according to an embodiment of the present disclosure.

An exemplary application of this embodiment of the present disclosure in an actual application scenario is described below. FIG. 9 is a schematic diagram of an architecture of a meeting control system according to an embodiment of the present disclosure. A meeting display terminal is a conventional video terminal of a conventional video meeting manufacturer. The meeting display terminal is connected to a meeting application corresponding to a target meeting by using a meeting connector without replacing an original hardware device. The meeting display terminal is connected to the meeting connector via a target communication protocol (such as H.323/SIP protocol), and the meeting connector is a gateway of a device with the target communication protocol (such as H.323/SIP protocol). When the target meeting displayed in the meeting display terminal is controlled, a control terminal (such as a smart phone) establishes a message channel between the control terminal and the meeting connector (that is, the foregoing meeting control channel) by scanning a graphic code displayed in a meeting interface displayed in the meeting display terminal, so that a meeting control instruction triggered based on an operation control in the control terminal is transmitted to the meeting connector through the message channel. After the meeting connector performs, in response to the meeting control instruction, a meeting control operation indicated by the meeting control instruction and obtains a meeting operation result, the meeting operation result is fed back to the meeting display terminal via the target communication protocol (such as H.323/SIP protocol), to control the target meeting displayed in the meeting display terminal.

Figure 10:
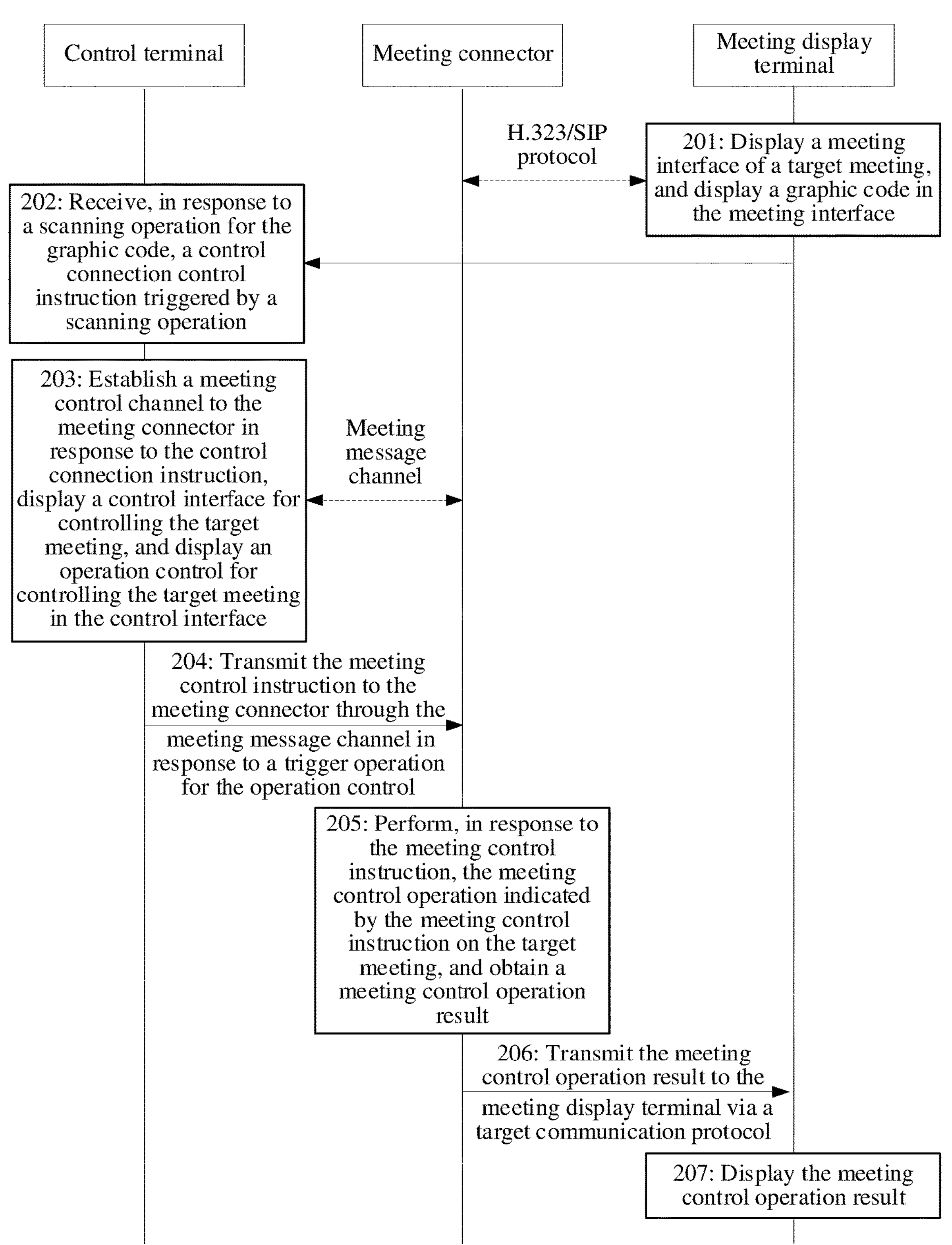
FIG. 10 is a schematic flowchart of another meeting control method according to an embodiment of the present disclosure.

Based on FIG. 9, FIG. 10 is a schematic flowchart of a meeting control method according to an embodiment of the present disclosure. An example in which the control terminal, the meeting display terminal, and the meeting connector shown in FIG. 2 perform the meeting control method provided in the embodiments of the present disclosure coordinately is used for description. The method includes:

Step 201: A meeting display terminal displays a meeting interface of a target meeting and displays a graphic code in the meeting interface.

After calling a meeting application for joining the target meeting, the meeting display terminal is assigned to a gateway instance (that is, a meeting connector) to process the call. During a target attendee attending the target meeting by using the meeting display terminal, a remote video screen displayed in the meeting display terminal is dynamically generated and sent by the gateway instance. In other words, the meeting interface for the online meeting for attendees in the target meeting is displayed in real time in the meeting display terminal. The meeting interface may display a meeting scenario screen of the target meeting, and may also display a graphic code (such as a two-dimensional code) used for connecting to the control terminal. The graphic code is superimposed and displayed on the meeting interface of the meeting display terminal by the gateway instance, and may be used as an address to identify the gateway instance.

In an exemplary embodiment, the graphic code may be displayed in the meeting interface in real time, or may be displayed selectively in the meeting interface, for example, the graphic code is only displayed within a target time period (such as 30 seconds) after the meeting display terminal is connected to the meeting application of the target meeting, or the graphic code is displayed periodically (such as every two minutes) in the meeting interface, or the graphic code is hidden in the meeting interface during the meeting. The target attendee may call out the graphic code at any time by using a remote control device configured to control the meeting display terminal.

Step 202: The control terminal receives, in response to a scanning operation for the graphic code, a control connection control instruction triggered by the scanning operation.

The control terminal is a terminal that can conveniently control the target meeting in the meeting display terminal, such as a smart phone. The graphic code in the meeting display terminal is scanned by an application in the control terminal with a graphic code scanning function, such as an instant messaging client or a meeting client with a scanning function, to trigger the connection control instruction.

Step 203: The control terminal establishes a meeting control channel to the meeting connector in response to the control connection instruction, displays a control interface for controlling the target meeting, and displays an operation control for controlling the target meeting in the control interface.

The connection control instruction is used for instructing an establishment of a meeting control channel between the control terminal and the meeting connector, and then a communication connection between the control terminal and the meeting display terminal is established based on the meeting control channel. When the graphic code displayed in the meeting display terminal scanned by the target attendee is successfully paired by the control terminal, the control terminal establishes a message channel (that is, the meeting control channel) associated with the meeting connector (that is, the foregoing gateway instance). The control interface may be displayed in a view interface of the control terminal, and the operation control for controlling the target meeting may be displayed in the control interface, such as a mute/unmute control, a camera on/off control, a layout switch control, an attendee management control, and a recording control. Thereafter, a graphical interactive operation performed on the control terminal, such as a mute/unmute operation, may be directly transmitted to the meeting connector through a private message channel between the control terminal and the meeting connector (that is, the foregoing gateway instance), and a performance of the meeting display terminal in the meeting is controlled by the meeting connector, such as muting and camera on/off. The control terminal may also apply for permission of a meeting host in a name of the target attendee corresponding to the meeting display terminal, to perform a meeting control operation on the target meeting.

Step 204: The control terminal transmits the meeting control instruction to the meeting connector through the meeting message channel in response to a trigger operation for the operation control.

In an exemplary embodiment, when there are a plurality of operation controls, different operation controls have different operation functions. When a user triggers a target operation control, the control terminal transmits the meeting control instruction corresponding to the target operation control to the meeting connector through the meeting control channel between the control terminal and the meeting connector, so that the meeting connector performs a corresponding meeting control operation based on the meeting control instruction.

Step 205: The meeting connector performs, in response to the meeting control instruction, the meeting control operation indicated by the meeting control instruction on the target meeting, and obtains a meeting control operation result.

After receiving the meeting control instruction, the meeting connector can perform a corresponding meeting control operation on the meeting interface of the target meeting displayed in the meeting display terminal. For example, meeting control operations such as turning on/off a microphone, turning on/off a camera, and switching layout are performed on the meeting interface of the target meeting displayed in the meeting display terminal, as shown in FIG. 6 or FIG. 7. Alternatively, the permission of the meeting host is applied in the name of the target attendee corresponding to the meeting display terminal, to perform the meeting control operation on the target meeting, as shown in FIG. 8.

Step 206: The meeting connector transmits the meeting control operation result to the meeting display terminal via a target communication protocol.

After performing the meeting control operation and determining the meeting control operation result, the meeting connector transmits the meeting control operation result to the meeting display terminal in real time to display a corresponding meeting control operation result in the meeting display terminal.

Step 207: The meeting display terminal displays the meeting control operation result.

For example, as shown in FIG. 6, before the control terminal performs a meeting control operation of "mute", a target attendee 601 corresponding to the meeting display terminal is in a non-mute state, and a non-mute prompt is displayed in a lower right corner of the target attendee 601. When the control terminal transmits a mute instruction to the meeting connector, the meeting connector performs the operation of "mute" on the target attendee, in other words, an audio medium transmitted on the meeting display terminal is turned off, so that another attendee in the meeting cannot hear a sound of the target attendee. In addition, the meeting display terminal receives a mute prompt in a lower right corner of a video, such as a superimposition of microphone off icons, to inform attendees in a meeting room that "You have been muted".

In the foregoing manner, by establishing a new meeting control channel between the control terminal and the meeting connector, a meeting control message of the online meeting that is being developed and gradually enriched is transmitted, so that the corresponding meeting control operation can be conveniently performed on the online meeting by the operation control on the control terminal. This is convenient to operate and improves efficiency of the control operation of the meeting. In addition, a rich interactive capability of a touch screen of the control terminal can implement and optimize meeting control experience of the conventional video meeting device to join the online meeting. This can effectively improve a utilization rate and a retention rate of an enterprise customer with the conventional video meeting device for the online meeting.

The following continues to describe an exemplary structure in which a meeting control apparatus 555 provided in the embodiments of the present disclosure is implemented as a software module. In some embodiments, the software module stored in the meeting control apparatus 555 in a memory 550 in FIG. 3 may include:

- a control connection module 5551, configured to display, in response to a control connection instruction for a target meeting in a meeting display terminal, a control interface for controlling the target meeting, and display an operation control for controlling the target meeting in the control interface;
- a control processing module 5552, configured to perform, in response to a meeting control instruction triggered based on the operation control, a meeting control operation indicated by the meeting control instruction on the target meeting; and
- a transmission module 5553, configured to transmit a meeting control operation result corresponding to the meeting control operation to the meeting display terminal.

In some embodiments, the apparatus further includes: a first instruction receiving module, configured to receive the control connection instruction for the target meeting displayed in the meeting display terminal before displaying the control interface for controlling the target meeting. The control connection instruction is triggered by a connection control entry displayed in the meeting display terminal. The connection control entry is used for connecting to the control terminal for controlling the target meeting in the meeting display terminal.

In some embodiments, the first instruction receiving module is further configured to receive the control connection instruction in response to a scanning operation for a graphic code used as the connection control entry.

The graphic code exists in a meeting interface of the target meeting displayed in the meeting display terminal.

In some embodiments, the transmission module 5553 is further configured to transmit a call-out instruction for the graphic code of the target meeting to the meeting display terminal during displaying the meeting interface in the meeting display terminal.

The call-out instruction is used for instructing the meeting display terminal to call out the graphic code and display the graphic code in the meeting interface.

In some embodiments, the first instruction receiving module is further configured to receive the control connection instruction for the target meeting transmitted by the meeting display terminal.

The control connection instruction is triggered by the meeting display terminal in response to a selection operation for the searched control terminal.

In some embodiments, the apparatus further includes: a first communication connection module, configured to establish a near field wireless communication connection with the meeting display terminal in response to the control connection instruction before displaying the control interface for controlling the target meeting.

Correspondingly, the transmission module is further configured to transmit the meeting control operation result to the meeting display terminal via the near field wireless communication connection.

In some embodiments, the apparatus further includes: a second instruction receiving module, configured to: display, when the control terminal is provided with a meeting control service for controlling the target meeting, a meeting query interface for querying a meeting; display, in response to a meeting identifier for the target meeting inputted based on the meeting query interface, at least one attendee corresponding to the target meeting; and receive, in response to a selection operation for a target attendee corresponding to the meeting display terminal in the at least one of attendees, the control connection instruction for the target meeting displayed in the meeting display terminal.

In some embodiments, before the displaying a control interface for controlling the target meeting, the apparatus further includes: a third instruction receiving module, configured to: display, when the control terminal is provided with the meeting control service for controlling the target meeting, an information editing interface in response to an open operation for the meeting control service, and display, in the information editing interface, a pairing code corresponding to the meeting display terminal; and receive, in response to an editing determining operation on the pairing code triggered based on the information editing interface, the control connection instruction for the target meeting displayed in the meeting display terminal.

In some embodiments, the apparatus further includes: a second communication connection module, configured to: establish a meeting control channel to a meeting connector, the meeting connector being connected to a meeting application corresponding to the target meeting via a target communication protocol; and establish a communication connection with the meeting display terminal based on the target communication protocol and the meeting control channel.

In some embodiments, the control processing module is further configured to: transmit the meeting control operation to the meeting connector through the meeting control channel, so that the meeting connector determines the meeting control operation result corresponding to the meeting control operation based on the meeting control operation; and transmit the meeting control operation result to the meeting display terminal via the target communication protocol to display the meeting control operation result in the meeting display terminal.

In some embodiments, the control connection module is configured to: use, when a quantity of the operation controls is at least two, a first display style to display a target operation control for performing a target type of meeting control operation on the target meeting; and use a second display style different from the first display style to display other operation controls than the target operation control in the at least two operation controls. The apparatus further includes: a fourth instruction receiving module, configured to receive, in response to a trigger operation for the target operation control, the meeting control instruction corresponding to the target type of meeting control operation. The control processing module is further configured to perform the target type of meeting control operation indicated by the meeting control instruction on the target meeting. Correspondingly, the transmission module is further configured to transmit the meeting control operation result corresponding to the target type of meeting control operation to the meeting display terminal.

The following continues to describe an exemplary structure in which a meeting control apparatus 556 provided in the embodiments of the present disclosure is implemented as software. In some embodiments, software modules in the meeting control apparatus 556 may include:

- an entry display module, configured to display a connection control entry, the connection control entry being used for connecting to a control terminal for controlling a target meeting; and
- a communication connection module, configured to establish a control connection with the control terminal in response to a control connection operation triggered based on the connection control entry, the control connection being used for the control terminal to control the target meeting.

The communication connection module is further configured to receive a meeting control operation result corresponding to a meeting control operation performed by the control terminal on the target meeting, and display the meeting control operation result.

In some embodiments, the entry display module is further configured to: display a meeting interface of the target meeting when the connection control entry is presented in the form of a graphic code, the meeting interface being used for at least two attendees to engage in an online conversation; and

- display, in the meeting interface, a graphic code corresponding to the target meeting.

In some embodiments, the entry display module is further configured to: determine a connection moment when the meeting display terminal connects to a meeting application corresponding to the target meeting, and display, in the meeting interface, the graphic code corresponding to the target meeting during a target time period starting from the connection moment; or

- display, in the meeting interface, the graphic code corresponding to the target meeting periodically during displaying the meeting interface in the meeting display terminal.

In some embodiments, the entry display module is further configured to: receive, by the meeting display terminal, a call-out instruction for the graphic code of the target meeting from a remote control device during displaying the meeting interface in the meeting display terminal; and

- call out the graphic code in response to the call-out instruction, and display the graphic code in the meeting interface.

In some embodiments, the entry display module is further configured to display, when the connection control entry is a search control used for searching for a terminal, at least one searched terminal in response to a trigger operation for the search control.

The at least one terminal includes the control terminal, and the terminal is registered with a meeting control service for controlling the target meeting.

The communication connection module is further configured to receive a selection operation for the control terminal, and determine the selection operation as the control connection operation.

An embodiment of the present disclosure provides a computer program product or a computer program. The computer program product or the computer program includes computer instructions stored on a computer-readable storage medium. A processor of a computer device reads the computer instructions from the computer-readable storage medium. The processor executes the computer instructions, so that the computer device implements the foregoing meeting control method in the embodiments of the present disclosure.

An embodiment of the present disclosure provides a computer-readable storage medium having executable instructions stored thereon. When the executable instructions are executed by a processor, the processor is enabled to implement the meeting control method provided in the embodiments of the present disclosure, for example, the method shown in FIG. 4.

The embodiments of the present disclosure provide the following beneficial effects. For example, according to the embodiments of the present disclosure, a target meeting in a meeting display terminal is controlled with the help of a control interface in a control terminal. Because the control interface in the control terminal displays an operation control for controlling the target meeting, the operation control may be used for conveniently performing a corresponding meeting control operation on the target meeting and transmitting a meeting control operation result corresponding to the meeting control operation to the meeting display terminal for display. This is convenient to operate and improves efficiency of the meeting control operation as well as utilization of hardware resources.

In some embodiments, the computer-readable storage medium may be a read-only memory (ROM), a random access memory (RAM), an erasable programmable read-only memory (EPROM), an electrically erasable programmable read-only memory (EEPROM), a flash memory, a magnetic surface memory, an optical disc, a CD-ROM, or the like, and may also be various devices including one of the foregoing memories or any combination thereof.

In some embodiments, the executable instructions may be written in the form of program, software, software module, script, or code in any form of programming language (including compilation or interpretation language, or declarative or procedural language), and the executable instructions may be deployed in any form, including being deployed as an independent program or being deployed as a module, component, subroutine, or other units suitable for use in a computing environment.

As an example, the executable instructions may, but not necessarily, correspond to a file in a file system, and may be stored as a part of the file that stores other programs or data, for example, stored in one or more scripts in a Hyper Text Markup Language (HTML) document, stored in a single file dedicated to the program under discussion, or stored in a plurality of collaborative files (for example, a file that stores one or more modules, subroutines, or code parts).

As an example, the executable instructions may be deployed to execute on one computing device or on a plurality of computing devices located in one location, alternatively, on a plurality of computing devices distributed in a plurality of locations and interconnected through communication networks.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing is only an example of the embodiments of the present disclosure and is not intended to limit the scope of protection of the present disclosure. Any modification, equivalent replacement, or improvement made without departing from the spirit and scope of the present disclosure shall fall within the protection scope of the present disclosure.

What is claimed is:

1. A meeting control method, performed by a terminal, the method comprising:

displaying, in response to a control connection instruction for a target meeting in a meeting display terminal, a control interface corresponding to the target meeting, and displaying one or more operation controls for controlling the target meeting in the control interface;

using, when a quantity of the one or more operation controls is at least two, a first display style to display a target operation control for performing a target type of meeting control operation on the target meeting;

using a second display style different from the first display style to display other operation controls than the target operation control in the at least two operation controls;

receiving, in response to a trigger operation for the target operation control, a meeting control instruction corresponding to the target type of meeting control operation;

performing, in response to the meeting control instruction triggered based on the target operation control, a meeting control operation indicated by the meeting control instruction on the target meeting; and transmitting a meeting control operation result corresponding to the meeting control operation to the meeting display terminal.

2. The method according to claim 1, further comprising:

receiving the control connection instruction for the target meeting in the meeting display terminal prior to displaying the control interface, the control connection instruction being triggered by a connection control entry displayed in the meeting display terminal, and the connection control entry being used for connecting to the terminal for controlling the target meeting.

3. The method according to claim 2, wherein receiving the control connection instruction for the target meeting displayed in the meeting display terminal comprises:

receiving the control connection instruction in response to a scanning operation for a graphic code used as the connection control entry, the graphic code existing in a meeting interface of the target meeting displayed in the meeting display terminal.

4. The method according to claim 3, further comprising:

transmitting a call-out instruction for the graphic code of the target meeting to the meeting display terminal during displaying the meeting interface in the meeting display terminal, the call-out instruction being used for instructing the meeting display terminal to call out the graphic code and display the graphic code in the meeting interface.

5. The method according to claim 2, further comprising:

receiving the control connection instruction for the target meeting transmitted by the meeting display terminal prior to displaying the control interface, the control connection instruction being triggered by the meeting display terminal in response to a selection operation for the searched terminal.

6. The method according to claim 5, further comprising:

establishing a near field wireless communication connection between the terminal and the meeting display terminal in response to the control connection instruction; and transmitting the meeting control operation result corresponding to the meeting control operation to the meeting display terminal comprises:

transmitting the meeting control operation result to the meeting display terminal via the near field wireless communication connection.

7. The method according to claim 1, further comprising:

displaying, when the terminal is provided with a meeting control service for controlling the target meeting, a meeting query interface for querying a meeting;

displaying, in response to a meeting identifier for the target meeting inputted based on the meeting query interface, at least one attendee corresponding to the target meeting; and triggering the control connection instruction for the target meeting in response to a selection operation for a target attendee corresponding to the meeting display terminal in the at least one of attendees.

8. The method according to claim 1, further comprising:

displaying, when the terminal is provided with the meeting control service for controlling the target meeting, an information editing interface in response to an open operation for the meeting control service, and displaying, in the information editing interface, a pairing code corresponding to the meeting display terminal; and triggering the control connection instruction for the target meeting in response to an editing determining operation for the pairing code.

9. The method according to claim 1, further comprising:

establishing a meeting control channel to a meeting connector, the meeting connector being connected to a meeting application corresponding to the target meeting via a target communication protocol; and establishing a communication connection with the meeting display terminal based on the target communication protocol and the meeting control channel.

10. The method according to claim 9, wherein transmitting the meeting control operation result corresponding to the meeting control operation to the meeting display terminal comprises:

transmitting the meeting control operation to the meeting connector through the meeting control channel, the meeting control operation being used for the meeting connector to determine, based on the meeting control operation, the meeting control operation result corresponding to the meeting control operation, and transmit the meeting control operation result to the meeting display terminal via the target communication protocol.

11. An electronic device, comprising:

a memory, configured to store executable instructions; and one or more processors, configured to execute the executable instructions stored in the memory to implement:

displaying, in response to a control connection instruction for a target meeting in a meeting display terminal, a control interface corresponding to the target meeting, and displaying one or more operation controls for controlling the target meeting in the control interface;

using, when a quantity of the one or more operation controls is at least two, a first display style to display a target operation control for performing a target type of meeting control operation on the target meeting;

using a second display style different from the first display style to display other operation controls than the target operation control in the at least two operation controls;

receiving, in response to a trigger operation for the target operation control, a meeting control instruction corresponding to the target type of meeting control operation;

performing, in response to the meeting control instruction triggered based on the target operation control, a meeting control operation indicated by the meeting control instruction on the target meeting; and transmitting a meeting control operation result corresponding to the meeting control operation to the meeting display terminal.

12. The device according to claim 11, wherein the one or more processors are further configured to perform:

receiving the control connection instruction for the target meeting in the meeting display terminal prior to displaying the control interface, the control connection instruction being triggered by a connection control entry displayed in the meeting display terminal, and the connection control entry being used for connecting to the terminal for controlling the target meeting.

13. The device according to claim 12, wherein the one or more processors are further configured to perform:

receiving the control connection instruction in response to a scanning operation for a graphic code used as the connection control entry, the graphic code existing in a meeting interface of the target meeting displayed in the meeting display terminal.

14. The device according to claim 13, wherein the one or more processors are further configured to perform:

transmitting a call-out instruction for the graphic code of the target meeting to the meeting display terminal during displaying the meeting interface in the meeting display terminal, the call-out instruction being used for instructing the meeting display terminal to call out the graphic code and display the graphic code in the meeting interface.

15. The device according to claim 12, wherein the one or more processors are further configured to perform:

receiving the control connection instruction for the target meeting transmitted by the meeting display terminal prior to displaying the control interface, the control connection instruction being triggered by the meeting display terminal in response to a selection operation for the searched terminal.

16. The device according to claim 15, wherein the one or more processors are further configured to perform:

establishing a near field wireless communication connection between the terminal and the meeting display terminal in response to the control connection instruction; and transmitting the meeting control operation result to the meeting display terminal via the near field wireless communication connection.

17. The device according to claim 11, wherein the one or more processors are further configured to perform:

displaying, when the terminal is provided with a meeting control service for controlling the target meeting, a meeting query interface for querying a meeting;

displaying, in response to a meeting identifier for the target meeting inputted based on the meeting query interface, at least one attendee corresponding to the target meeting; and triggering the control connection instruction for the target meeting in response to a selection operation for a target attendee corresponding to the meeting display terminal in the at least one of attendees.

18. The device according to claim 11, wherein the one or more processors are further configured to perform:

displaying, when the terminal is provided with the meeting control service for controlling the target meeting, an information editing interface in response to an open operation for the meeting control service, and displaying, in the information editing interface, a pairing code corresponding to the meeting display terminal; and triggering the control connection instruction for the target meeting in response to an editing determining operation for the pairing code.

19. A non-transitory computer-readable storage medium, containing executable instructions stored thereon that, when being executed, cause at least one processor to implement:

displaying, in response to a control connection instruction for a target meeting in a meeting display terminal, a control interface corresponding to the target meeting, and displaying one or more operation controls for controlling the target meeting in the control interface;

using, when a quantity of the one or more operation controls is at least two, a first display style to display a target operation control for performing a target type of meeting control operation on the target meeting;

using a second display style different from the first display style to display other operation controls than the target operation control in the at least two operation controls;

receiving, in response to a trigger operation for the target operation control, a meeting control instruction corresponding to the target type of meeting control operation;

performing, in response to the meeting control instruction triggered based on the target operation control, a meeting control operation indicated by the meeting control instruction on the target meeting; and transmitting a meeting control operation result corresponding to the meeting control operation to the meeting display terminal.

* * * * *